July 26, 1938.     F. C. BRADLEY     2,124,903
EYEGLASS REPAIR DEVICE
Filed May 11, 1937
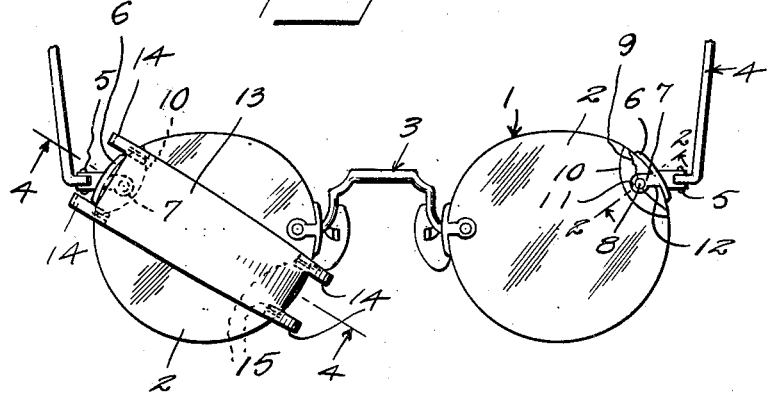
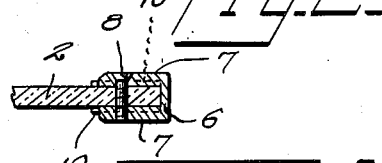
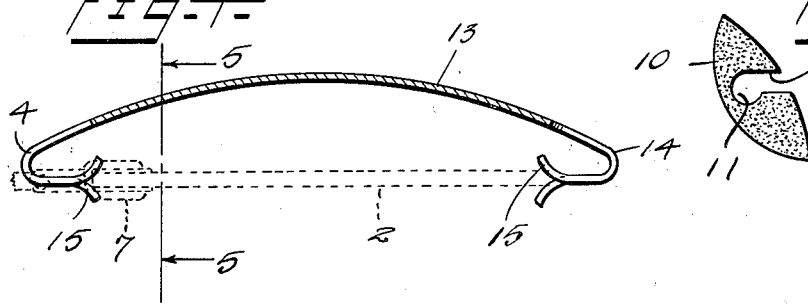
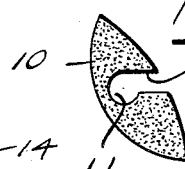
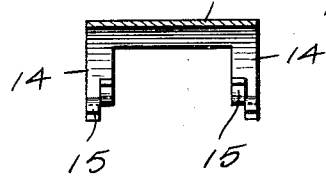
Inventor
F. C. Bradley
By Watson E. Coleman
Attorney Patented July 26, 1938

2,124,903

UNITED STATES PATENT OFFICE 2,124,903

EYEGLASS REPAIR DEVICE

Francois C. Bradley, Union, Miss.

Application May 11, 1937, Serial No. 142,035

1 Claim. (Cl. 88—47)

This invention relates to the class of optics and pertains particularly to devices for use in the repairing or mending of eye-glass lenses.

In eye-glasses of the rimless type the temple bars are applied directly to the edge of the lenses by the use of a coupling pin which is inserted through a hole drilled in the lens in close proximity to the edge. Such lenses are easily and frequently broken because of the weakening of the glass by the formation of the aperture for reception of the temple bar securing pin and when such a break occurs the break line usually takes an arcuate form and passes through the pin opening so that the temple bar comes away from the lens with a portion of the lens still attached thereto. When such an accident occurs it is impossible for the owner of the glasses to use the same because of his inability to establish a new connection between the temple bar and lens and, therefore, the glasses are of no further use until the owner can take them to an optometrist for repair.

The invention has for its primary object to provide a novel inexpensive device by means of which a temporary repair can be made in the event that a lens becomes broken in the manner described so that the owner of the glasses can continue to use the same until it is possible for him to have a new lens prepared and inserted in place of the broken one.

Another object of the invention is to provide a lens repair device consisting of a transparent wafer adapted to be secured by a suitable cement over the break in an eye-glass lens so that the break will be repaired in such a manner that the lens may be used and the repair device will not interfere in any way with the vision.

Still another object of the invention is to provide in association with a repair device of the character above set forth, a novel holding or clamping means for securing the broken lens parts together in proper relation until the repair element has become firmly fixed to the glass.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

Figure 1 is a view in elevation of a pair of rimless eye-glasses illustrating upon one lens an attached repair device of a character embodying the present invention and upon the other lens an improved bowed clamp designed for maintaining the lens parts in assembled relation;

Figure 2 is a sectional view taken on the line 2—2 of Figure 1;

Figure 3 is a view in plan of a repair wafer;

Figure 4 is a longitudinal sectional view through the bowed clamp, the section being taken on the line 4—4 of Figure 1 with the inserted lens shown in dotted outline;

Figure 5 is a section on the line 5—5 of Figure 4.

Referring now more particularly to the drawing, wherein like numerals of reference designate corresponding parts throughout the several views, the numeral 1 generally designates a pair of eye-glasses or spectacles of the rimless variety, in which the lenses are indicated by the numeral 2, the connecting nose piece by the numeral 3, and the temple bars by the numeral 4. As is well known glasses of this type have the temple bars joined by a hinge connection 5 with a plate 6 which positions against the edge of the lens and has two spaced portions 7 between which the lens positions, and secured to the lens by a rivet pin 8 which passes through an aperture in the lens. As previously stated, such glasses frequently become broken and when a break occurs it usually extends along an arcuate line which passes through the aperture for the pin or screw 8, such a break line being indicated by the numeral 9.

The present invention consists in the provision of a transparent wafer such as is indicated by the numeral 10, which is designed to be secured by cement or in any other suitable manner to the lens around the securing rivet 8 and over the break line 9 so as to firmly secure together the main body portion of the lens and the small portion which has broken out. This wafer is preferably of elongated elliptical outline as illustrated so that one arcuate edge will conform to the edge outline of the lens and thus make it possible to make a neat job of the repair. An aperture is formed in the wafer which is designed to receive the rivet 8 and an edge opening 12 is formed which leads into the aperture so that the wafer may be easily slipped into position with the rivet passing through the aperture in the manner illustrated.

In the use of the wafer it is preferred that two be employed by placing them upon opposite sides of the lens to thus establish a firm connection between the two broken pieces thereof.

In order to facilitate the attachment of the repair wafers there has been devised a clamping device which consists of a longitudinally bowed elongated strip of metal 13, each end of which is provided with the two reversely bent fingers 14 each of which is bifurcated as indicated at 15. This bowed clamp is of the proper length to facilitate its engagement diagonally across a lens in the manner illustrated with the edge of the lens opposite the point where the temple bar is attached, engaged between the furcations of the two fingers 14 adjacent thereto and with the other two fingers having their furcations engaged over the plate 6. Since the bowed clamp, being longitudinally arcuate as described, must be flattened out and therefore slightly elongated in order to place it in the position described, it will be apparent that after it has been put into place, following the application of the repair wafers to the lens, it will tend to return to its original bowed condition and thus firmly press the two portions of the broken lens together and hold them in this relation until the attaching cement or adhesive used in association with the wafers, has dried.

While the drawing illustrates the repair device as being applied to the portion of the lens to which the temple bar is attached, it is to be understood that the device is intended to be used on the inner side of the lens also, should a break occur at the point where the nose piece is attached.

I claim:—

Means for holding together two broken parts of an eye-glass lens of the rimless variety, comprising an elongated longitudinally bowed band of resilient material, a pair of arms extending in spaced relation longitudinally from each end of the band and reversely bent whereby the ends of the arms at one end of the band will be in opposed relation with the ends of the arms at the other end of the band, and a pair of fingers extending longitudinally from the free end of each arm, the said fingers of each pair being longitudinally and oppositely curved and the holding means being in entirety a structural integral.

FRANCOIS C. BRADLEY.